US012739049B2

(12) United States Patent
Su

(10) Patent No.: US 12,739,049 B2
(45) Date of Patent: Sep. 15, 2026

(54) OPTICAL SIGNAL TRANSMISSION METHOD AND APPARATUS

(71) Applicant: HUAWEI TECHNOLOGIES CO., LTD., Shenzhen (CN)

(72) Inventor: Wei Su, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 18/661,218

(22) Filed: May 10, 2024

(65) Prior Publication Data

US 2024/0297728 A1 Sep. 5, 2024

Related U.S. Application Data

(63) Continuation of application No. PCT/CN2022/131118, filed on Nov. 10, 2022.

(30) Foreign Application Priority Data

Nov. 12, 2021 (CN) ......................... 202111340909.8

(51) Int. Cl.
*H04J 14/02* (2006.01)

(52) U.S. Cl.
CPC ................................ *H04J 14/0307* (2023.08)

(58) Field of Classification Search
None
See application file for complete search history.

(56) References Cited

U.S. PATENT DOCUMENTS

| | | | | |
|---|---|---|---|---|
| 7,894,482 | B1 * | 2/2011 | Wu | H04J 3/1652 370/476 |
| 8,446,922 | B2 * | 5/2013 | Yin | H04J 3/0647 370/520 |
| 9,497,064 | B2 * | 11/2016 | Su | H04L 47/16 |
| 10,505,662 | B2 * | 12/2019 | Vissers | H04J 14/08 |
| 10,680,733 | B2 * | 6/2020 | Su | H04L 12/4633 |
| 11,063,686 | B2 * | 7/2021 | Vissers | H04J 3/1652 |

(Continued)

FOREIGN PATENT DOCUMENTS

| | | |
|---|---|---|
| CN | 112511260 A | 3/2021 |
| CN | 112511920 A | 3/2021 |

(Continued)

*Primary Examiner* — Jai M Lee

(74) *Attorney, Agent, or Firm* — Leydig, Voit & Mayer, Ltd.

(57) ABSTRACT

An optical signal transmission method and an apparatus are provided, to reduce processing complexity while maximizing bandwidth utilization. An OPUk multiplexing frame with a bit rate greater than 1.25 Gbps is constructed by using a structure of an OPU0 multiplexing frame, so that the structure of the OPU0 multiplexing frame can be reused by a structure of the OPUk multiplexing frame, and the structure of the OPUk multiplexing frame is aligned with the structure of the OPU0 multiplexing frame. The OPUk multiplexing frame includes an integer multiple of OPUk frames, and a boundary of the OPUk multiplexing frame remains aligned with a boundary of the OPUk frame. According to this application, when mapping an OSU frame, an OTN device may map the OSU frame to the OPUk multiplexing frame based on the reused structure of the OPU0 multiplexing frame.

28 Claims, 9 Drawing Sheets

(56) References Cited

U.S. PATENT DOCUMENTS

| | | | | |
|---|---|---|---|---|
| 2010/0142947 | A1* | 6/2010 | Shin | H04J 3/1652 398/43 |
| 2012/0002671 | A1* | 1/2012 | Xiao | H04Q 11/00 398/43 |
| 2013/0058655 | A1* | 3/2013 | Okubo | H04J 3/076 398/66 |

FOREIGN PATENT DOCUMENTS

| | | | |
|---|---|---|---|
| CN | 112511921 | A | 3/2021 |
| CN | 112584259 | A | 3/2021 |
| CN | 113395613 | A | 9/2021 |
| EP | 3396880 | A1 | 10/2018 |
| EP | 3955479 | A1 | 2/2022 |
| EP | 4075820 | A1 | 10/2022 |
| RU | 2691748 | C1 | 6/2019 |
| WO | 2020221141 | A1 | 11/2020 |
| WO | 2021139604 | A1 | 7/2021 |

* cited by examiner

OPTICAL SIGNAL TRANSMISSION METHOD AND APPARATUS

CROSS-REFERENCE TO RELATED APPLICATIONS

This application a continuation of International Application No. PCT/CN2022/131118, filed on Nov. 10, 2022, which claims priority to Chinese Patent Application No. 202111340909.8, filed on Nov. 12, 2021. The disclosures of the aforementioned applications are hereby incorporated by reference in their entireties.

TECHNICAL FIELD

Embodiments of this application relate to the field of optical communication technologies, and in particular, to an optical signal transmission method and an apparatus.

BACKGROUND

As a key technology of a next-generation transport network, an optical transport network (OTN) features high bandwidth, large capacity, high reliability, low latency, and the like. Currently, the optical transport network technology is being further extended to an access network. To enable the OTN technology to have a transmission capability as low as several megabits per second, a transmission container with a rate as low as 2.6 M may be provided by using an optical service unit (OSU). Specifically, an OSU frame carrying service data may be mapped to an optical data unit (ODU) k/flex for transmission. However, how to divide the ODUk/flex to reduce processing complexity while maximizing bandwidth utilization is to be discussed.

SUMMARY

Embodiments of this application provide an optical signal transmission method and an apparatus, to reduce processing complexity while maximizing bandwidth utilization.

According to a first aspect, an embodiment of this application provides an optical signal transmission method. The method includes: mapping an OSU frame to an optical payload unit OPUk multiplexing frame, where a bit rate of the OPUk multiplexing frame is greater than 1.25 Gbps, the OPUk multiplexing frame includes M1*N OPUk frames, a payload area of the OPUk multiplexing frame includes P payload blocks, and P is N times of $P_0$; $P_0$ is a quantity of payload blocks included in an OPU0 multiplexing frame, and the OPU0 multiplexing frame includes M1 OPU0 frames; or $P_0$ is 1/M2 of a quantity of payload blocks included in an OPU0 multiplexing frame, and the OPU0 multiplexing frame consists of M1*M2 OPU0 frames, where N is an integer greater than 1, M1 is an integer greater than or equal to 1, and M2 is an integer greater than 1; mapping the M1*N OPUk frames to M1*N ODUk frames one by one; and sending the M1*N ODUk frames.

In this embodiment of this application, the OPUk multiplexing frame with a bit rate greater than 1.25 Gbps is constructed by using a structure of the OPU0 multiplexing frame, so that the structure of the OPU0 multiplexing frame is reused by the structure of the OPUk multiplexing frame, and the structure of the OPUk multiplexing frame is aligned with the structure of the OPU0 multiplexing frame. The OPUk multiplexing frame includes an integer multiple of OPUk frames. A boundary of the OPUk multiplexing frame remains aligned with a boundary of the OPUk frame. Further, when mapping the OSU frame, an OTN device may map the OSU frame to the OPUk multiplexing frame based on the reused structure of the OPU0 multiplexing frame. A position of the payload block may be quickly obtained in each transport period, thereby reducing processing complexity.

In a possible design, the quantity P of the payload blocks included in the OPUk multiplexing frame satisfies the following formula:

$$P = \text{floor}\left[\frac{R_{OPU\_PLD} * (1 - x \text{ ppm})}{R_{ref} * P_0}\right] * P_0.$$

$P_0$ represents the quantity of payload blocks included in the OPU0 multiplexing frame, floor represents rounding down, $R_{OPU\_PLD}$ represents a bit rate of an OPUk payload area, x represents a frequency offset, ppm represents parts per million, and $R_{ref}$ represents a baseline rate of a payload block. In the foregoing design, a bit rate $R_{OPU0\_PLD}$ of an OPU0 payload area is used as a denominator, and the implementation is simple.

In a possible design, the quantity of payload blocks included in the OPUk multiplexing frame satisfies the following formula:

$$P = \text{floor}\left[\frac{R_{OPU\_PLD} * (1 - x \text{ ppm})}{R_{ref} * P_0 * (1 + y \text{ ppm})}\right] * P_0.$$

$P_0$ represents the quantity of payload blocks included in the OPU0 multiplexing frame, floor represents rounding down, $R_{OPU\_PLD}$ represents a bit rate of an OPUk payload area, x and y each represent a frequency offset, ppm represents parts per million, and $R_{ref}$ represents a baseline rate of a payload block. In the foregoing design, the frequency offset y ppm is considered to be used in a denominator, so that calculation precision is further improved, and a calculated P value is more accurate. x is a frequency offset of a bit rate of the OPUk frame, and y is a frequency offset of the baseline rate.

In a possible design, $R_{ref}$ is 2.6 Mbit/s.

In a possible design, the quantity of payload blocks included in the OPUk multiplexing frame satisfies the following formula:

$$P = \text{floor}\left[\frac{R_{OPU\_PLD} * 1 - x \text{ ppm})}{R_{OPUo\_PLD}}\right] * P_0.$$

$P_0$ represents the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x represents a frequency offset. In the foregoing design, $R_{ref}$*$P_0$ is used as a denominator, so that bandwidth utilization efficiency may be further improved.

In a possible design, the quantity of payload blocks included in the OPUk multiplexing frame satisfies the following formula:

$$P = \text{floor}\left[\frac{R_{OPU\_PLD} * (1 - x \text{ ppm})}{R_{OPUo\_PLD} * (1 + y \text{ ppm})}\right] * P_0.$$

$P_0$ represents the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x and y each represent a frequency offset. In the foregoing design, the frequency offset y ppm is considered to be used in a denominator, so that calculation precision is further improved, and a calculated P value is more accurate.

In a possible design, the quantity of payload blocks included in the OPUk multiplexing frame satisfies the following formula:

$$P = \text{floor}\left[\frac{R_{OPU\_PLD} * (1 - x \text{ ppm})}{(1/M2) * R_{POUo\_PLD}}\right] * P_0.$$

$P_0$ represents 1/M2 of the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x represents a frequency offset. In the foregoing design, the bit rate $R_{OPU0\_PLD}$ of the payload area of the OPU0 frame and M2 are directly used as a denominator, and the implementation is simple.

In a possible design, the quantity of payload blocks included in the OPUk multiplexing frame satisfies the following formula:

$$P = \text{floor}\left[\frac{R_{OPU\_PLD} * (1 - x \text{ ppm})}{(1/M2) * R_{OPUo\_PLD} * (1 + y \text{ ppm})}\right] * P_0.$$

$P_0$ represents 1/M2 of the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x and y each represent a frequency offset. In the foregoing design, the frequency offset y ppm is considered to be used in a denominator, so that calculation precision is further improved, and a calculated P value is more accurate.

In a possible design, an overhead area of each of the M1*N ODUk frames includes a multiframe indication. M1*N multiframe indications each indirectly indicate (or implicitly indicate) a bit position of a payload block included in a payload area of each OPUk frame in the M1*N OPUk frames; or an overhead area of each of the M1*N OPUk frames includes a multiframe indication. In the foregoing design, in addition to indicating a position of the OPUk frame, the multiframe indication indirectly indicates the bit position of the payload block included in the payload area of each OPUk frame in the M1*N OPUk frames. In this way, other bit overheads may be reduced.

In a possible design, an overhead area of each of the M1*N OPUk frames includes a first multiframe indication and a second multiframe indication. The M1*N OPUk frames include N OPUk groups. Each OPUk group includes M1 consecutive OPUk frames. Each of M1 first multiframe indications included in the OPUk group indirectly indicates a bit position of a payload block included in each OPUk frame in the OPUk group. A second multiframe indication included in each OPUk frame in the OPUk group indicates a position of the OPUk group in the N OPUk groups. Alternatively, an overhead area of each of the M1*N ODUk frames includes a first multiframe indication and a second multiframe indication. In the foregoing design, in addition to indicating a position of the OPUk frame, a two-level multiframe indication indirectly indicates the bit position of the payload block included in the payload area of each OPUk frame in the M1*N OPUk frames. In this way, other bit overheads may be reduced.

In a possible design, the OPUk is an OPU2, an OPU2*e*, an OPU3, an OPU4, an OPU25, an OPU25*u*, an OPU50, an OPU50*u*, an OPUCn, or an OPUflex.

In a possible design, $P_0$ is the quantity of payload blocks included in the OPU0 multiplexing frame, and $P_0$=476.

In a possible design, $P_0$ is 1/M2 of the quantity of payload blocks included in the OPU0 multiplexing frame, and $P_0$=238.

According to a second aspect, an embodiment of this application provides an optical signal transmission apparatus. The apparatus includes a processor and a memory. The memory is configured to store program codes. The processor is configured to read and execute the program code stored in the memory, to implement the method according to any one of the first aspect or the designs of the first aspect.

According to a third aspect, an embodiment of this application provides an optical signal transmission apparatus. The apparatus includes a processor and an optical transceiver. The processor is connected to the optical transceiver through a line, and is configured to perform the method according to any one of the first aspect or the designs of the first aspect. The processor may send an OTN frame by using the optical transceiver.

According to a fourth aspect, an embodiment of this application further provides a computer storage medium. The storage medium stores a software program. When the software program is read and executed by one or more processors, the method provided in any design of the first aspect may be implemented.

According to a fifth aspect, an embodiment of this application provides a computer program product including instructions. When the computer program product runs on a computer, the computer is enabled to perform the method provided in any design of the first aspect.

According to a sixth aspect, an embodiment of this application provides a chip. The chip includes a communication interface and a processor. The processor is connected to the communication interface through a line, and is configured to perform the method provided in any design of the first aspect.

In a possible design, the chip is connected to a memory, and is configured to read and execute a software program stored in the memory, to implement the method provided in any design of the first aspect.

In a possible design, the chip may be further connected to an optical transceiver. The chip receives and sends OTN frames by using the optical transceiver.

According to a seventh aspect, an embodiment of this application provides an OPUk multiplexing frame. A bit rate of the OPUk multiplexing frame is greater than 1.25 Gbps. The OPUk multiplexing frame consists of M1*N OPUk frames. A payload area of the OPUk multiplexing frame includes P payload blocks, and P is N times of $P_0$. $P_0$ is a quantity of payload blocks included in an OPU0 multiplexing frame. The OPU0 multiplexing frame consists of M1 OPU0 frames. Alternatively, $P_0$ is 1/M2 of a quantity of payload blocks included in an OPU0 multiplexing frame. The OPU0 multiplexing frame consists of M1*M2 OPU0 frames. N is an integer greater than 1, M1 is an integer greater than or equal to 1, and M2 is an integer greater than 1.

It should be understood that technical solutions of the second aspect to the seventh aspect of this application are the same as or similar to the technical solutions of the first aspect of this application. Beneficial effects achieved in each aspect and corresponding feasible implementations are similar. Details are not described herein again.

BRIEF DESCRIPTION OF DRAWINGS

To describe the technical solutions in embodiments of this application more clearly, the following briefly describes the accompanying drawings used for describing embodiments.

DESCRIPTION OF EMBODIMENTS

The following describes the technical solutions in embodiments of this application with reference to the accompanying drawings in embodiments of this application.

A network architecture and a service scenario described in embodiments of this application are intended to describe the technical solutions in embodiments of this application more clearly, and do not constitute any limitation on the technical solutions provided in embodiments of this application. A person of ordinary skill in the art may learn that the technical solutions provided in embodiments of this application are equally applicable to a similar technical problem as a network architecture evolves and a new service scenario emerges.

The technical solutions provided in embodiments of this application are applicable to an optical network, for example, an OTN. An OTN is generally formed by connecting a plurality of OTN devices through optical fibers, and may be of different topological types such as a line type, a ring type, and a mesh-shaped type depending on specific requirements.

Figure 1:
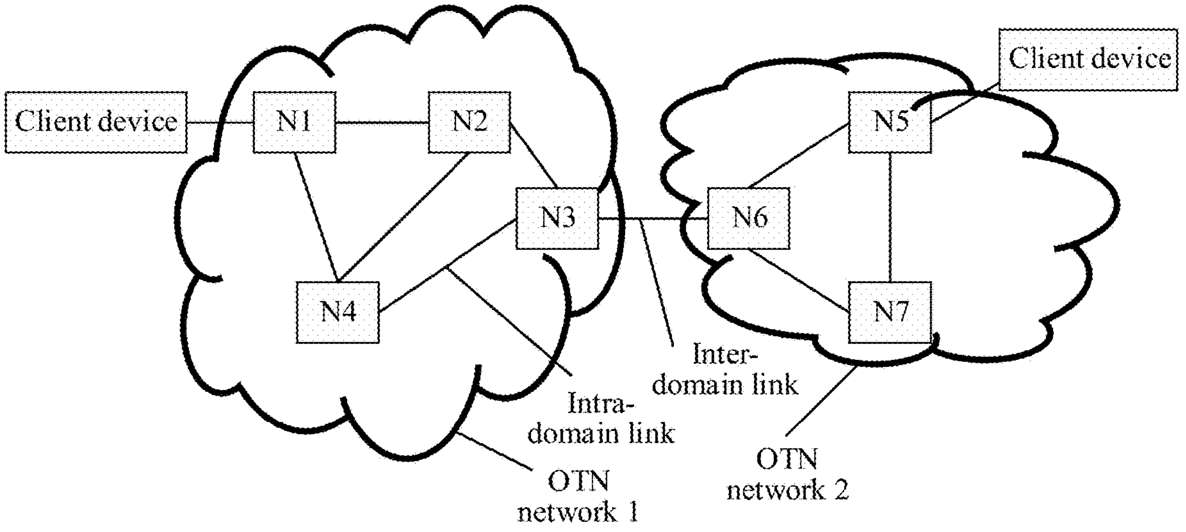
FIG. 1 is a diagram of a network architecture according to this application.

FIG. 1 is a diagram of a network architecture according to this application. An OTN shown in FIG. 1 includes two OTN networks (an OTN network 1 and an OTN network 2). Each OTN network includes a specific quantity of OTN devices (represented by N in FIG. 1). A link between devices in an OTN network is an intra-domain link, and a link between devices in OTN networks is an inter-domain link. Depending on actual requirements, one OTN device may have one or more functions. Generally, OTN devices are classified into an optical-layer device, an electrical-layer device, and a photoelectric hybrid device. The optical-layer device is a device capable of processing an optical-layer signal, for example, an optical amplifier (OA). The electrical-layer device is a device capable of processing an electrical-layer signal, for example, a device capable of processing an ODU signal. The photoelectric hybrid device is a device capable of processing an optical-layer signal and an electrical-layer signal. It should be noted that, depending on specific integration requirements, a plurality of different functions may be integrated into one OTN device. The technical solutions provided in this application are applicable to OTN devices of different forms and integrations. Refer to FIG. 1. The OTN network may further be connected to client devices, such as client devices connected to N1 and N5 in FIG. 1. A quantity of client devices connected to the OTN network is not specifically limited in embodiments of this application. The OTN device in the OTN network is configured for transport of service data of the client device. For example, the OTN device may receive the service data of the client device, then map the service data to an OSU frame, and further map the OSU frame to an OTN frame, and send the OTN frame to another OTN device. For example, the service data may be data of a constant bit rate (CBR) service, data of a packet (PKT) type service, or data of a synchronous transport module (synchronous transport module-N, STM-N) service. For example, the client device may be a router, a switch, or a synchronous digital hierarchy (SDH) device. This is not specifically limited in this application.

Figure 2:
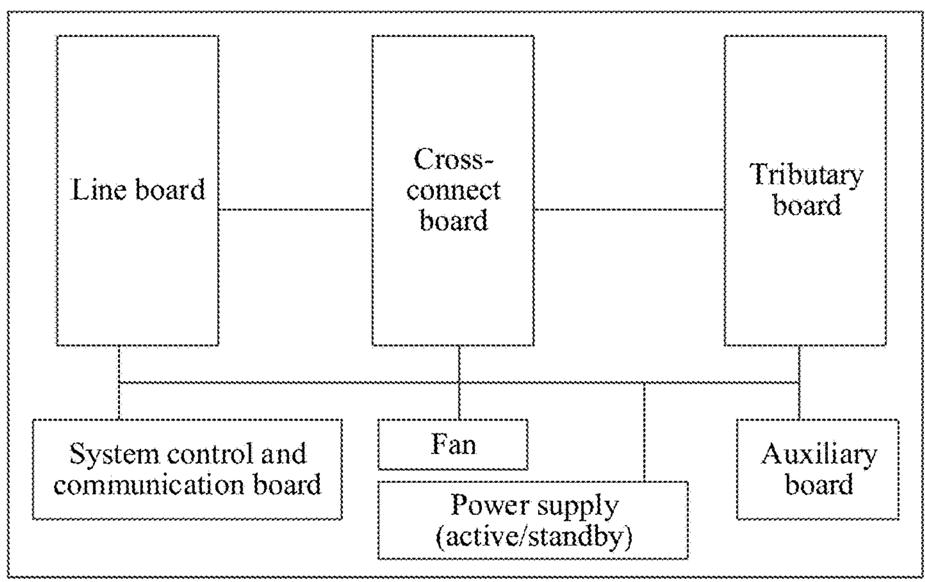
FIG. 2 is a diagram of a hardware structure of an OTN device according to this application.

FIG. 2 is a diagram of a hardware structure of an OTN device according to this application. Specifically, the OTN device includes a power supply, a fan, and an auxiliary board, and may further include a tributary board, a line board, a cross-connect board, and a system control and communication board. The line board may include an optical-layer processing board. It should be noted that types and quantities of boards that are specifically included in each device may vary depending on specific requirements. For example, a network device serving as a core node may have no tributary board. A network device serving as an edge node may have a plurality of tributary boards. The power supply is configured to supply power to the OTN device, and may include an active power supply and a standby power supply. The fan is configured to dissipate heat of the device. The auxiliary board is configured to provide an auxiliary function, for example, provide an external alarm or access an external clock. The tributary board, the cross-connect board, and the line board are mainly configured to process an electrical-layer signal of an OTN (hereinafter referred to as an OTN frame). The tributary board is configured to receive and send various client services, for example, a synchronous digital hierarchy (SDH) service, a packet service, an Ethernet service, and a fronthaul service. Further, the tributary board may be divided into an optical module on a client side and a signal processor. The optical module on the client side may be an optical transceiver, and is configured to receive and/or send client signals. The signal processor is configured to map the client signal to the OTN frame and demap the client signal from the OTN frame. The cross-connect board is configured to implement exchange of OTN frames, and complete exchange of one or more types of OTN frames. The line board mainly implements processing of an OTN frame on a line side. Specifically, the line board may be divided into an optical module on the line side and a signal processor. The optical module on the line side may be an optical transceiver on the line side, and is configured to receive and/or send OTN frames. The signal processor is configured to multiplex and demultiplex, or map and demap the OTN frame on the line side. The system control and communication board is configured to implement system control and communication. Specifically, information may be collected from different boards by using a backboard, or a control instruction is sent to a corresponding board. Unless otherwise specified, there may be one or more specific components (for example, the tributary board). This is not limited in this application. It should be noted that types of boards included in the device and specific function designs and quantities of boards are not limited in embodiments of this application.

The following first briefly describes some terms and technologies used in embodiments of this application.

(1) OTN Frame

At an electrical layer, an OTN frame processed by an OTN device may use a frame format defined by the International Telecommunication Union-Telecommunication Standard Sector (ITU-T), for example, the G.709 standard and the G.709.1 standard, to implement interworking between devices. Existing standards have defined OTN frames with a plurality of rates, for example, an OPUk frame, an ODUk frame, and an OTUk frame, where k=0, 1, 2, 2e, 3, 4, 25, 25u, 50, 50u, Cn, and flex. For example, Table 1 describes corresponding OPU payload bit rates (kbit/s) in the cases that k is set to different values. In addition, when k=Cn, the OPU payload bit rate is approximately n*100 Gbit/s; and when k=flex, the OPU payload bit rate is approximately n*1.25 Gbit/s. It should be understood that an ODUk payload bit rate is approximately the same as an OPUk payload bit rate. For example, an ODU2 payload bit rate is approximately the same as an OPU2 payload bit rate.

TABLE 1

| OPU type | OPU payload bit rate (kbit/s) |
|---|---|
| OPU0 | 1 238 954.310 |
| OPU1 | 2 488 320.000 |
| OPU2 | 9 995 276.962 |
| OPU2e | 10 356 012.658 |
| OPU3 | 40 150 519.322 |
| OPU4 | 104 355 975.330 |
| OPU25 | 26 299 210.130 |
| OPU25u | 24 991 818.732 |
| OPU50 | 52 598 420.261 |
| OPU50u | 49 983 637.464 |

Figure 3:
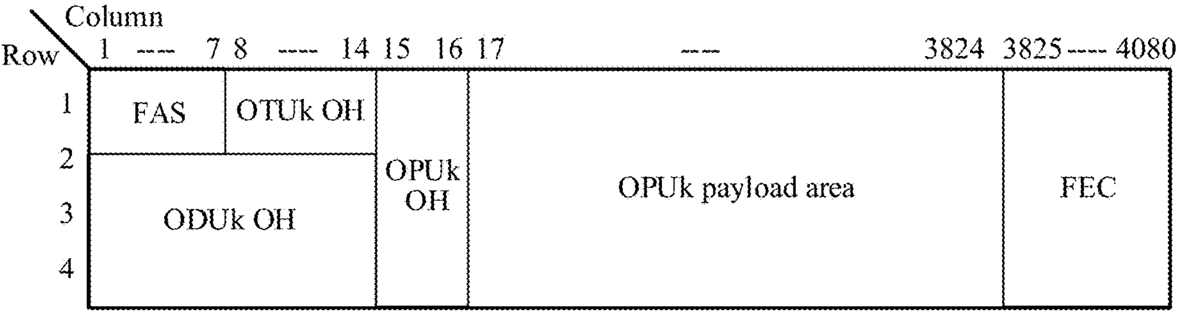
FIG. 3 is a diagram of a frame structure of an OPUk frame.

FIG. 3 is a diagram of a frame structure of an OPUk frame, where kCn. One OTUk frame has 4 rows*4080 columns. An OPUk payload area and an OPUk overhead area (that is, an OPUk OH) form an OPUk frame. The OPUk frame and an ODUk overhead area (that is, an ODUk OH) form an ODUk frame. The ODUk frame, an OTUk overhead area (that is, an OTUk OH), a frame alignment signal (FAS), and a forward error correction (FEC) check area form an OTUk frame. Specifically, in the OTUk frame, columns 1 to 7 in row 1 are the FAS and a multiframe alignment signal (MFAS), columns 8 to 14 in row 1 are the OTUk OH, columns 1 to 14 in rows 2 to 4 are the ODUk OH, columns 15 and 16 in rows 1 to 4 are the OPUk OH, columns 17 to 3824 in rows 1 to 4 are the OPUk payload area, and columns 3825 to 4080 in rows 1 to 4 are the FEC check area. The OPUk OH and the OPUk payload area form the OPUk frame structure.

For a case in which k=Cn, an OTUCn frame consists of n OTUC instance frames, where C represents a bit rate being 100 Gbit/s. The OTUC instance frame does not include the FEC check area. The OTUCn frame includes an OPUCn frame (that is, columns 15 to 3824 in the OTUCn frame). The OPUCn frame includes n OPUC instance frames (that is, columns 15 to 3824 in one OTUC instance frame). A payload area of the OPUCn frame may include payload areas of the n OPUC instance frames which are interleaved based on a specific quantity of bytes. It should be noted that the OTUC instance frame is a basic frame unit for forming the OTUCn frame, and may also be referred to as an OTUC basic frame or another name. This is not limited in this application.

(2) Payload Block

The payload block is located in a payload area of an OPUk frame and consists of one byte or a plurality of consecutive bytes, or a plurality of consecutive bits. Specifically, a size of the payload block may be an integer multiple of the byte, or may be an integer multiple of 8 bytes, for example, 16 bytes, 32 bytes, 64 bytes, 128 bytes, 192 bytes, or 256 bytes. Optionally, sizes of different payload blocks are equal. This is used as an example for description in the following specific examples. The payload block may also be referred to as a time slot (time slot or tributary slot), a time slot block (time slot block or tributary slot block), a time slice (time slice or tributary slice), a logical time slot (logical time slot or logical tributary slot), or another name. This is not limited in this application.

Two consecutive bytes mentioned in embodiments of this application may be two adjacent bytes in a same row in a payload area of one OPUk frame; or may be the last byte in a row of a payload area of one OPUk frame and the 1$^{st}$ byte in a next row of the row; or may be the last byte in a payload area of one OPUk frame and the 1$^{st}$ byte in a payload area of a next OPUk frame of the OPUk frame. "Byte" may be replaced with "bit". In other words, the payload block may be located in a same row in the payload area of one OPUk frame, or may be located in different rows, or may cross payload areas of OPUk frames.

(3) Multiplexing Frame

A transport period may include P consecutive payload blocks. The P consecutive payload blocks may be located in payload areas of a plurality of OPUk frames. In some embodiments, the plurality of OPUk frames may be referred to as an OPUk multiplexing frame or an OPUk transport frame, or may be referred to as another name, for example, a time slot multiplexing frame (time slot multiplexing frame or tributary slot multiplexing frame), a transport period frame, or a P-frame. This is not specifically limited in embodiments of this application. In some other embodiments, the P consecutive payload blocks each may be referred to as an OPUk multiplexing frame or an OPUk transport frame, or may be referred to as another name. In embodiments of this application, the transport period may also be referred to as a bearing period, a sending period, a mapping period, or the like. In some embodiments, each transport period includes a same quantity of payload blocks. For ease of description, in embodiments of this application, a number (or an index) of a payload block in each OPUk multiplexing frame is 1 to P. In the accompanying drawings, for example, #1 to #P are used for description. This is uniformly described herein, and details are not described below.

(4) In embodiments of this application, an OSU frame may be used to carry service data, so that a transmitting end processes and sends the service data. For example, the OSU frame may include an overhead area and a payload area. The overhead area may be used for carrying a service-related identifier. The payload area of the OSU frame may be used for carrying the service data. For example, the payload area may provide storage space of a size such as 8 bytes, 16 bytes, 32 bytes, 64 bytes, 128 bytes, 196 bytes, 240 bytes, 256 bytes, or 512 bytes to store the service data. In some embodiments, a size of an OSU may be equal to an integer multiple of a size of a payload block.

(5) Transmitting End and Receiving End

In embodiments of this application, the transmitting end is a device that sends service data in an OTN. The receiving end is a device that receives the service data in the OTN. Both the transmitting end and the receiving end may be OTN devices described above.

(6) "A plurality of" in embodiments of this application refers to two or more. The term "at least one (type)" in embodiments of this application includes one (type) or more (types). "A plurality of (types)" refers to two (types) or more than two (types). For example, at least one of A, B, and C includes: Only A exists, only B exists, both A and B exist, both A and C exist, both B and C exist, and all of A, B, and C exist. In descriptions of this application, unless otherwise specified, "/" means "or", for example, "A/B" means A or B. The term "and/or" describes an association relationship for describing associated objects and represents that three relationships may exist. For example, A and/or B may represent the following three cases: Only A exists, both A and B exist, and only B exists. In addition, it should be understood that in descriptions of this application, terms such as "first" and "second" are merely used for distinguishing and description, but should not be understood as indicating or implying relative importance, or should not be understood as indicating or implying a sequence. A mathematical symbol "*" in embodiments of this application represents a multiplication sign. "floor" in this application represents rounding down, and rounding down may also be represented by a data symbol "$\lfloor\ \rfloor$".

To maximize bandwidth utilization, a possible manner is to determine a quantity of payload blocks included in an OPUk multiplexing frame based on an OPU payload rate and a baseline rate of the payload block. For example, a quantity P of payload blocks included in the OPUk multiplexing frame may be determined according to the following formula (1):

$$P = \text{floor}\left[\frac{R_{OPU\_PLD} * (1 - T_{OPU})}{R_{ref} * (1 + 1000\text{ ppm})}\right] \quad \text{Formula (1)}$$

$R_{OPU\_PLD}$ represents an OPUk payload bit rate. $T_{OPU}$ represents a frequency offset of a bit rate of an OPUk frame. $R_{ref}$ represents the baseline rate of the payload block. ppm represents parts per million. When a P value is calculated, a positive frequency offset of 1000 ppm is reserved for the baseline rate of the payload block. In this way, a rate of the payload block on a line is greater than the baseline rate of the payload block, ensuring that sufficient redundant bandwidth is reserved on the line to satisfy service bearing. A value of $T_{OPU}$ is +/−20 ppm.

With reference to the foregoing formula (1), in the cases that k is set to different values, the calculated P value may be shown in Table 2.

TABLE 2

| ODU type | OPU payload rate (kbit/s) | ODU frequency offset (ppm) | P value |
|---|---|---|---|
| ODU0 | 1 238 954.310 | +/−20 | 476 |
| ODU1 | 2 488 320.000 | +/−20 | 956 |
| ODU2 | 9 995 276.962 | +/−20 | 3840 |
| ODU2e | 10 356 012.658 | +/−100 | 3978 |
| ODU3 | 40 150 519.322 | +/−20 | 15426 |
| ODU4 | 104 355 975.330 | +/−20 | 40096 |
| ODU25 | 26 299 210.130 | +/−20 | 10104 |
| ODU25u | 24 991 818.732 | +/−20 | 9602 |
| ODU50 | 52 598 420.261 | +/−20 | 20209 |
| ODU50u | 49 983 637.464 | +/−20 | 19204 |

Figure 4:
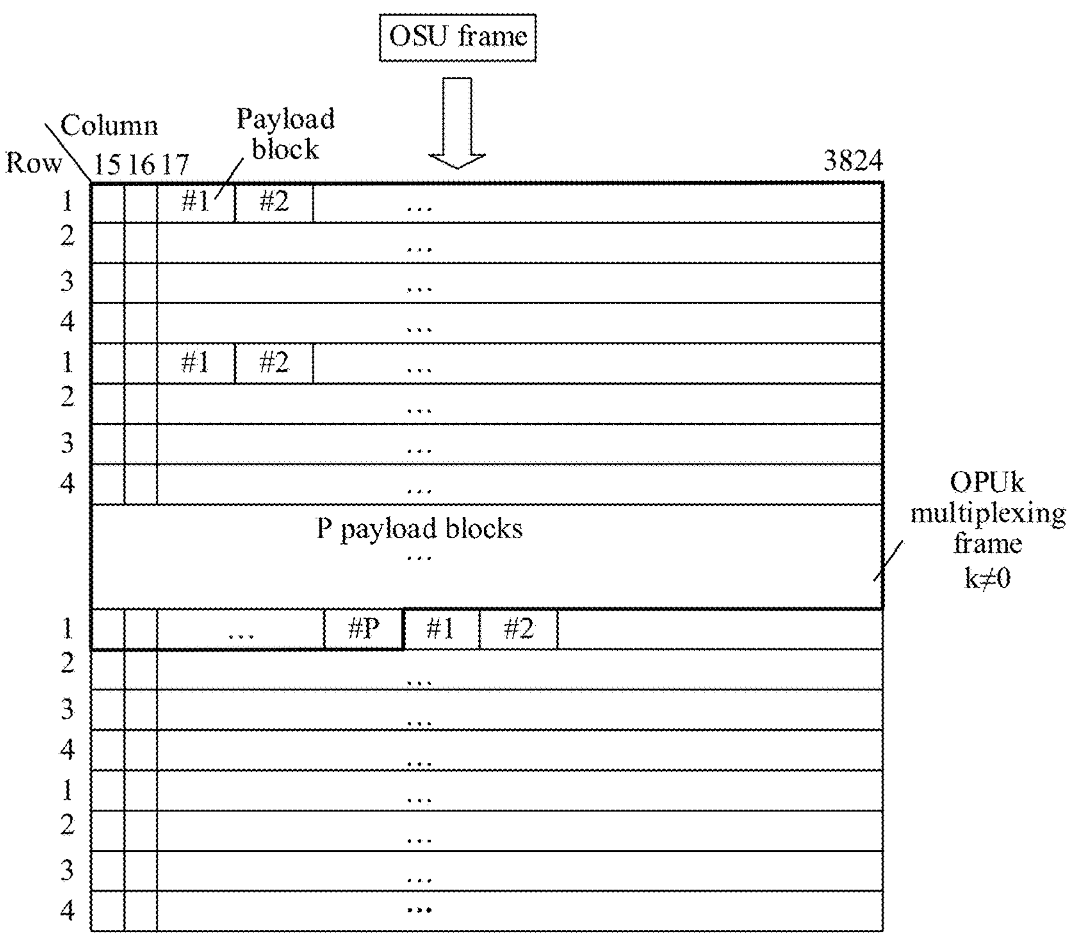
FIG. 4 is a diagram of a structure of an OPUk multiplexing frame.

FIG. 4 is a diagram of a structure of an OPUk multiplexing frame. As shown in FIG. 4, there is no rule between P values of different OPUk multiplexing frames. For example, a position of a payload block #1 in the OPUk multiplexing frame shown in the black box in FIG. 4 is different from a position of a payload block #1 in another adjacent OPUk multiplexing frame. As a result, the structure of the OPUk multiplexing frame is disordered, and layouts of payload blocks of multiplexing frames cannot be reused. Consequently, processing complexity is increased additionally.

An embodiment of this application provides a structure of another OPUk multiplexing frame with k≠0. k≠0 means that a bit rate of a payload area of the OPUk multiplexing frame is greater than 1.25 Gbps. In this application, a structure of an OPUk multiplexing frame with a bit rate greater than 1.25 Gbps is constructed based on an OPU0 multiplexing frame, to bear an OSU frame. A structural rule of the OPUk multiplexing frame is to enable the structure of the OPUk multiplexing frame to align with a structure of the OPU0 multiplexing frame, and reuse the structure of the OPU0 multiplexing frame, to reduce processing complexity.

The OPUk multiplexing frame may be constructed with reference to a complete structure of the OPU0 multiplexing frame. An example in which the OPUk multiplexing frame consists of M1*N OPUk frames is used. A payload area of the OPUk multiplexing frame includes P payload blocks, and P is N times of $P_0$. $P_0$ is an integer multiple of ((Least common multiple of a size of a payload area of an OPUk frame and a size of a payload block)/Size of the payload block). For example, the size of the payload block is an integer multiple of a byte, or an integer multiple of 8 bytes, for example, 16 bytes, 32 bytes, 64 bytes, 128 bytes, 192 bytes, or 256 bytes. For example, the size of the payload area of the OPUk frame is 15232 bytes. For example, if the size of the payload block is 192 bytes, the least common multiple of 15232 and 192 is 45696. According to the foregoing formula, a value of $P_0$ may be a multiple of 238, for example, 238 or 476.

In a first possible manner, the OPUk multiplexing frame may be constructed with reference to the complete structure of the OPU0 multiplexing frame. An example in which the OPUk multiplexing frame consists of M1*N OPUk frames is used. The payload area of the OPUk multiplexing frame includes P payload blocks, and P is N times of $P_0$. For ease of distinguishing from P in the foregoing formula (1), P is referred to as $P_1$ herein. $P_0$ is a quantity of payload blocks included in the OPU0 multiplexing frame. For ease of differentiation, $P_0$ is referred to as $P_{0\text{-}1}$ when the first possible manner is described. The OPU0 multiplexing frame includes M1 OPU0 frames, or the OPU0 multiplexing frame includes payload areas of M1 OPU0 frames. Nis an integer greater than 1, and M1 is an integer greater than or equal to 1.

In a second possible manner, the OPUk multiplexing frame may be constructed with reference to a partial structure of the OPU0 multiplexing frame. For example, the OPU0 multiplexing frame may be divided into a plurality of parts with a same structure. Therefore, the OPUk multiplexing frame may be constructed with reference to the partial structures. An example in which the OPUk multiplexing frame consists of M1*N OPUk frames is still used. The payload area of the OPUk multiplexing frame includes $P_1$ payload blocks, and $P_1$ is N times of $P_0$. $P_0$ is 1/M2 of a quantity of payload blocks included in the OPU0 multiplexing frame. For ease of distinguishing from $P_0$ in the first possible manner, $P_0$ is referred to as $P_{0-2}$ herein. The OPU0 multiplexing frame includes M1*M2 OPU0 frames. N is an integer greater than 1, M1 is an integer greater than or equal to 1, and M2 is an integer greater than 1. In some embodiments, the OPU0 multiplexing frame may be divided into M2 parts, structures of the M2 parts are the same, and quantities of payload blocks included in the M2 parts are the same.

The following describes the first possible manner with reference to the accompanying drawings.

Figure 5:
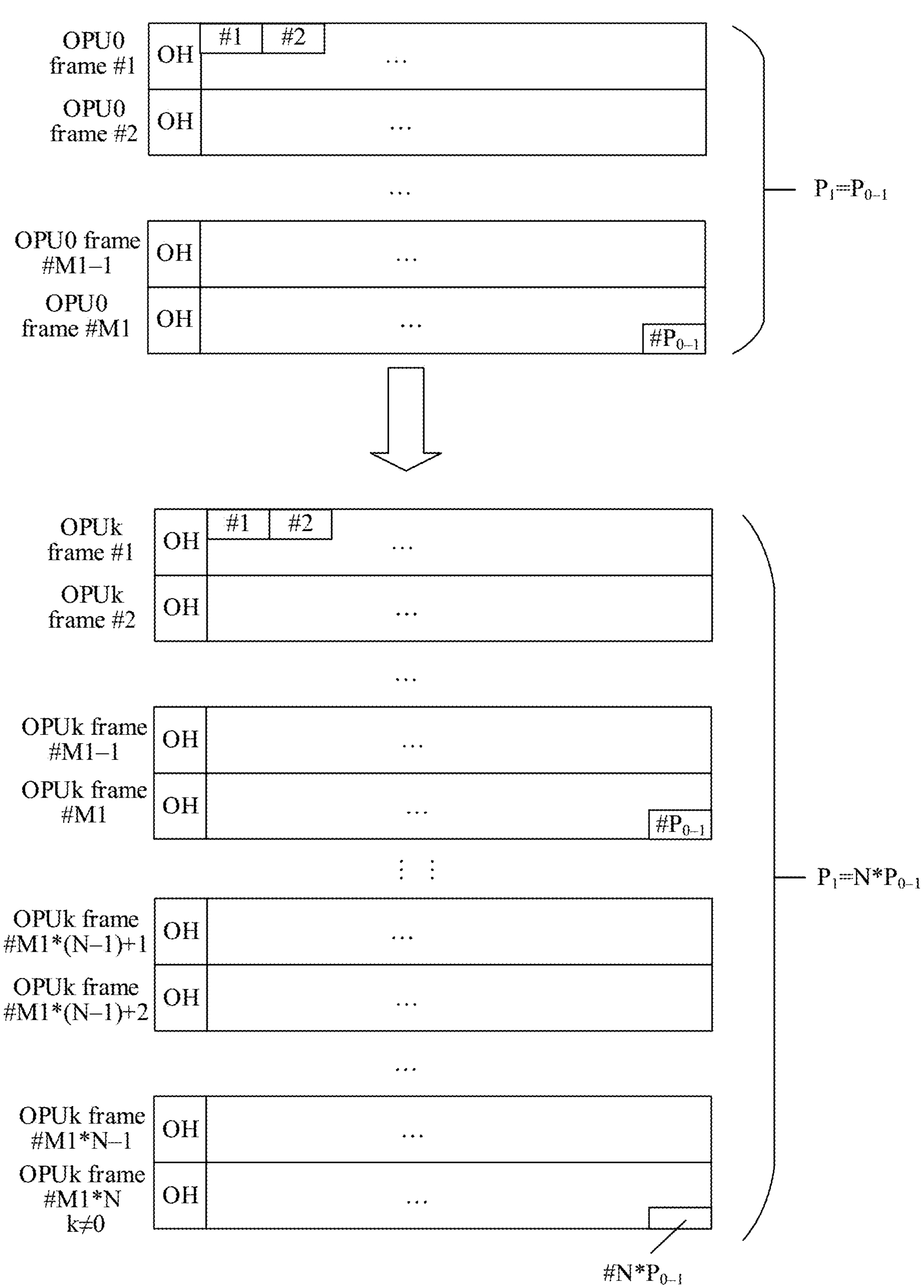
FIG. 5 is a diagram of a structural relationship between an OPU0 multiplexing frame and an OPUk multiplexing frame according to an embodiment of this application.

FIG. 5 is a diagram of a structural relationship between an OPU0 multiplexing frame and an OPUk multiplexing frame according to an embodiment of this application. As shown in FIG. 5, the OPU0 multiplexing frame consists of M1 OPU0 frames, which are OPU0 frames #1 to #M1. The quantity of payload blocks included in the OPU0 multiplexing frame is $P_{0-1}$. The OPUk multiplexing frame consists of M1*N OPUk frames, which are OPUk frames #1 to #M1*N. If the payload area of the OPUk multiplexing frame includes $P_1$ payload blocks, $P_1=N*P_{0-1}$. The payload blocks included in the OPUk multiplexing frame are #1 to #$N*P_{0-1}$.

In some embodiments, the quantity of payload blocks included in the OPUk multiplexing frame may be determined in any one of the following manners.

Manner 1: The quantity of payload blocks included in the OPUk multiplexing frame satisfies the following formula (2).

$$P_1 = \text{floor}\left[\frac{R_{OPU\_PLD} * (1 - x\text{ ppm})}{R_{OPU0\_PLD}}\right] * P_{0-1} \quad \text{Formula (2)}$$

$P_{0-1}$ represents the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x represents a frequency offset. For example, a value of x may be 0, 20, or 100. In Manner 1, the bit rate $R_{OPU0\_PLD}$ of the OPU0 payload area is used as a denominator, and the calculation is simple.

For example $$N = \text{floor}\left[\frac{R_{OPU\_PLD} * (1 - xppm)}{R_{OPU0\_PLD}}\right]$$

is determined based on manner 1.

Manner 2: The quantity of payload blocks included in the OPUk multiplexing frame satisfies the following formula (3).

$$P_1 = \text{floor}\left[\frac{R_{OPU\_PLD} * (1 - xppm)}{R_{OPU0\_PLD} * (1 + yppm)}\right] * P_{0-1} \quad \text{Formula (3)}$$

$P_{0-1}$ represents the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x and y each represent a frequency offset. For example, a value of x may be 0, 20, or 100. In some embodiments, y is a specified value, representing a frequency offset of a baseline rate. In Manner 2, the frequency offset y ppm is used as a denominator, to improve calculation precision, so that a calculated value $P_1$ is more accurate.

For example, $$N = \text{floor}\left[\frac{R_{OPU\_PLD} * (1 - xppm)}{R_{OPU0\_PLD} * (1 + yppm)}\right]$$

is determined based on Manner 2.

Manner 3: The quantity of payload blocks included in the OPUk multiplexing frame satisfies the following formula (4).

$$P_1 = \text{floor}\left[\frac{R_{OPU\_PLD} * (1 - xppm)}{R_{ref} * P_{0-1}}\right] * P_{0-1} \quad \text{Formula (4)}$$

$P_{0-1}$ represents the quantity of payload blocks included in the OPU0 multiplexing frame, floor represents rounding down, $R_{OPU\_PLD}$ represents a bit rate of an OPUk payload area, x represents a frequency offset, and $R_{ref}$ represents a baseline rate of a payload block. For example, $R_{ref}$ is 2.6 Mbit/s (megabits per second). In Manner 3, $R_{ref}*P_{0-1}$ is used as a denominator. Compared with Manner 1, in Manner 3, bandwidth utilization efficiency may be further improved.

For example, $$N = \text{floor}\left[\frac{R_{OPU\_PLD} * (1 - xppm)}{R_{ref} * P_{0-1}}\right]$$

is determined based on Manner 3.

Manner 4: The quantity of payload blocks included in the OPUk multiplexing frame satisfies the following formula (5).

$$P_1 = \text{floor}\left[\frac{R_{OPU\_PLD} * (1 - xppm)}{R_{ref} * P_{0-1} * (1 + yppm)}\right] * P_{0-1} \quad \text{Formula (5)}$$

$P_{0-1}$ represents the quantity of payload blocks included in the OPU0 multiplexing frame, floor represents rounding down, $R_{OPU\_PLD}$ represents a bit rate of an OPUk payload area, x and y each represent a frequency offset, and $R_{ref}$ represents a baseline rate of a payload block. For example, $R_{ref}$ is 2.6 Mbit/s (megabits per second). In Manner 4, a frequency offset y ppm is considered to be used in a denominator, to improve calculation precision, so that a calculated $P_1$ value is more accurate.

For example, $$N = \text{floor}\left[\frac{R_{OPU\_PLD} * (1 - xppm)}{R_{ref} * P_{0-1} * (1 + yppm)}\right]$$

is determined based on Manner 4.

In embodiments of this application, to complete indications of the M1*N OPUk frames included in the OPUk multiplexing frame, multiframe indication overheads may be defined. In some embodiments, the multiframe indication overhead may be located in an ODUk overhead area. When the OPUk frame is mapped to an ODUk frame, a multiframe indication is added to an overhead area of the ODUk frame. The M1*N OPUk frames are mapped to M1*N ODUk frames one by one, and the multiframe indication is added to an overhead area of each ODUk frame in the M1*N ODUk frames. The multiframe indication not only indicates a position of the OPUk frame in the OPUk multiplexing frame, but also indirectly (or implicitly) indicates a bit position of a payload block included in a payload area of each OPUk frame in the M1*N OPUk frames. The ODUk frames may be sequentially counted from 0 to M1*N−1, or from 1 to M1*N based on the multiframe indication in the overhead area of each ODUk frame.

The multiframe indication overhead may alternatively be located in an OTUk overhead area, or may be constructed by using an original MFAS in an OTN frame.

In some other embodiments, the multiframe indication overhead may alternatively be located in an OPUk overhead area, that is, located in a column 15 or 16 of an OTUk frame. An overhead area of each OPUk frame in the M1*N OPUk frames includes a multiframe indication. The multiframe indication not only indicates a position of the OPUk frame in the OPUk multiplexing frame, but also indirectly (or implicitly) indicates a bit position of a payload block included in a payload area of each OPUk frame in the M1*N OPUk frames. The OPUk frames may be sequentially counted from 0 to M1*N−1, or from 1 to M1*N based on the multiframe indication in the overhead area of each OPUk frame.

The multiframe indication overhead may alternatively be located in an OTUk overhead area, or may be constructed by using an original MFAS in an OTN frame.

In some other embodiments, a two-level multiframe indication may indicate a bit position of a payload block included in a payload area of each OPUk frame. For ease of description, two-level multiframe indications are referred to as a first multiframe indication and a second multiframe indication. An overhead area of each of the M1*N OPUk frames includes the first multiframe indication and the second multiframe indication. Every M1 consecutive OPUk frames in the M1*N OPUk frames forms an OPUk group. The OPUk group may be referred to as an OPUk multiframe, or may be referred to as another name, for example, "M1-frame multiframe". This is not specifically limited in this application. The M1*N OPUk frames include N OPUk groups. M1 first multiframe indications included in each OPUk group not only indicate M1 OPUk frames, but also indirectly indicate a bit position of a payload block included in each OPUk frame in the OPUk group. The second multiframe indication included in each OPUk frame in the OPUk group indicates a position of the OPUk group in the N OPUk groups. The second multiframe indication is used to perform cumulative counting on the OPUk group, for example, start an indication from 0 and count sequentially to N-1.

For example, the two-level multiframe indications may be located in an overhead area of an OPUk frame, or may be located in an overhead area of an ODUk frame, or may be located in an OTUk overhead area, or may be constructed by using an original MFAS in an OTN frame. Alternatively, one level of the two-level multiframe indication may be located in the overhead area of the OPUk frame, and the other level of the two-level multiframe indication may be located in the overhead area of the ODUk frame. For example, the first multiframe indication is located in the overhead area of the OPUk frame, and the second multiframe indication is located in the overhead area of the ODUk frame.

Figure 6:
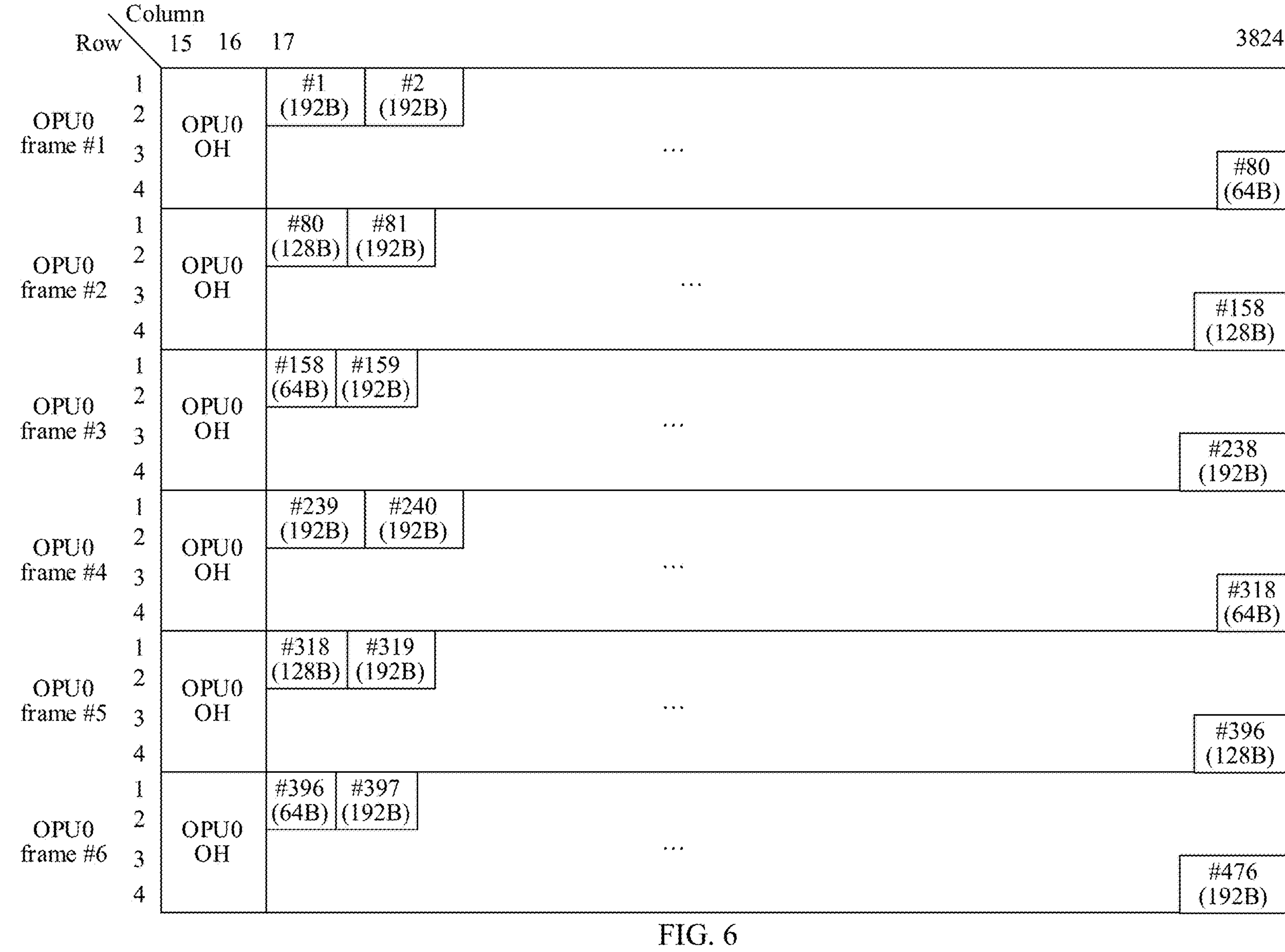
FIG. 6 is a diagram of a structure of an OPU0 multiplexing frame according to an embodiment of this application.

For example, a size of the payload block is 192 bytes. The OPU0 multiplexing frame includes six OPU0 frames. The quantity $P_{0-1}$ of payload blocks included in the OPU0 multiplexing frame is 476. FIG. 6 is a diagram of a structure of an OPU0 multiplexing frame according to an embodiment of this application. Refer to FIG. 6. A payload area of the OPU0 multiplexing frame consists of 476*192-byte payload blocks. In this case, it may be understood that M1-6.

Figure 7:
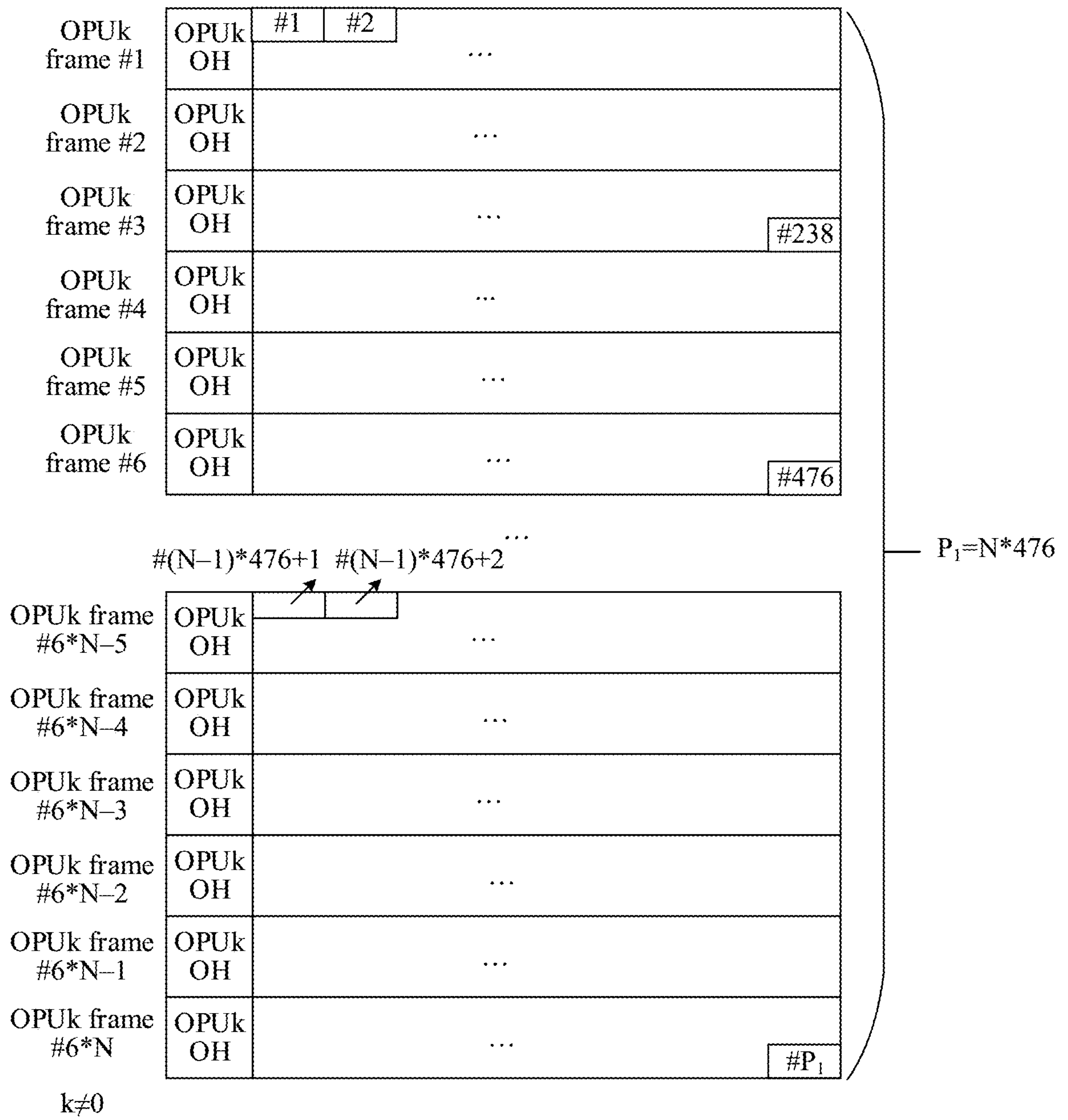
FIG. 7 is a diagram of a structure of an OPUk multiplexing frame according to an embodiment of this application.

FIG. 7 is a diagram of a structure of an OPUk multiplexing frame according to an embodiment of this application. The OPUk multiplexing frame includes 6N OPUk frames. For example, every six consecutive OPUk frames may be understood as an OPUk group, and the OPUk multiplexing frame includes N OPUk groups. The OPUk group may also be understood as a multiframe including six OPUk frames, and may also be referred to as an OPUk multiframe or a six-frame OPUk multiframe. A payload area of each OPUk multiframe is divided into 476*192-byte payload blocks. Refer to FIG. 7. The payload blocks are sequentially marked as a payload block #1, a payload block #2, . . . , and a payload block #$P_1$ starting from the first payload block in the first OPUk frame, where a size of each payload block is 192 bytes.

For example, Table 3 shows a value of $P_1$ when k is set to different values in the OPUk multiplexing frame. In Table 3, an example in which a size of a payload block is 192 bytes is used. In Table 3, an example in which a value of x is 20 ppm is used. The value of $P_1$ in Table 3 is determined based on an ODU bit rate. A relationship between an ODU payload bit rate and an OPU payload bit rate is: ODU payload bit rate-OPU payload bit rate*239/238.

TABLE 3

| | ODU payload bit rate (bit/s) | Frequency offset (ppm) | Quantity of frames | Quantity of 192-byte payload blocks in a multiplexing frame ($P_1$) | Period of a 192-byte payload block (ns) | Bit rate of a 192-byte payload block (bit/s) |
|---|---|---|---|---|---|---|
| ODU0 | 1,244,160,000.000 | 20 | 6 | 476 | 1234.568 | 2,602,845.188 |
| ODU1 | 2,498,775,126.050 | 20 | 12 | 952 | 614.701 | 2,613,781.513 |
| ODU2 | 10,037,273,924.051 | 20 | 48 | 3,808 | 153.030 | 2,624,810.127 |
| ODU25u | 25,096,826,373.626 | 20 | 120 | 9,520 | 61.203 | 2,625,191.043 |
| ODU25 | 26,409,711,013.216 | 20 | 126 | 9,996 | 58.160 | 2,630,973.402 |
| ODU3 | 40,319,218,983.051 | 20 | 192 | 15,232 | 38.096 | 2,635,932.203 |
| ODU50u | 50,193,652,747.253 | 20 | 240 | 19,040 | 30.601 | 2,625,191.043 |
| ODU50 | 52,819,422,026.432 | 20 | 252 | 19,992 | 29.080 | 2,630,973.402 |

TABLE 3-continued

| | ODU payload bit rate (bit/s) | Frequency offset (ppm) | Quantity of frames | Quantity of 192-byte payload blocks in a multiplexing frame ($P_1$) | Period of a 192-byte payload block (ns) | Bit rate of a 192-byte payload block (bit/s) |
|---|---|---|---|---|---|---|
| ODU4 | 104,794,445,814.978 | 20 | 504 | 39,984 | 14.657 | 2,609,943.361 |
| . . . | . . . | 20 | . . . | . . . | . . . | . . . |
| ODUflex (OSU, n) | 1,244,160,000.00000 | 20 | 6 | 476 | 1234.568 | 2,602,845.188 |
| ODUflex (OSU, n) | 2,488,320,000.00000 | 20 | 12 | 952 | 617.284 | 2,602,845.188 |
| ODUflex (OSU, n) | 3,732,480,000.00000 | 20 | 18 | 1,428 | 411.523 | 2,602,845.188 |
| ODUflex (OSU, n) | 4,976,640,000.00000 | 20 | 24 | 1,904 | 308.642 | 2,602,845.188 |
| ODUflex (OSU, n) | 6,220,800,000.00000 | 20 | 30 | 2,380 | 246.914 | 2,602,845.188 |
| ODUflex (OSU, n) | 7,464,960,000.00000 | 20 | 36 | 2,856 | 205.761 | 2,602,845.188 |
| ODUflex (OSU, n) | 8,709,120,000.00000 | 20 | 42 | 3,332 | 176.367 | 2,602,845.188 |
| ODUflex (OSU, n) | 9,953,280,000.00000 | 20 | 48 | 3,808 | 154.321 | 2,602,845.188 |
| ODUflex (OSU, n) | 11,197,440,000.00000 | 20 | 54 | 4,284 | 137.174 | 2,602,845.188 |

The following describes the second possible manner with reference to the accompanying drawings.

Figure 8:
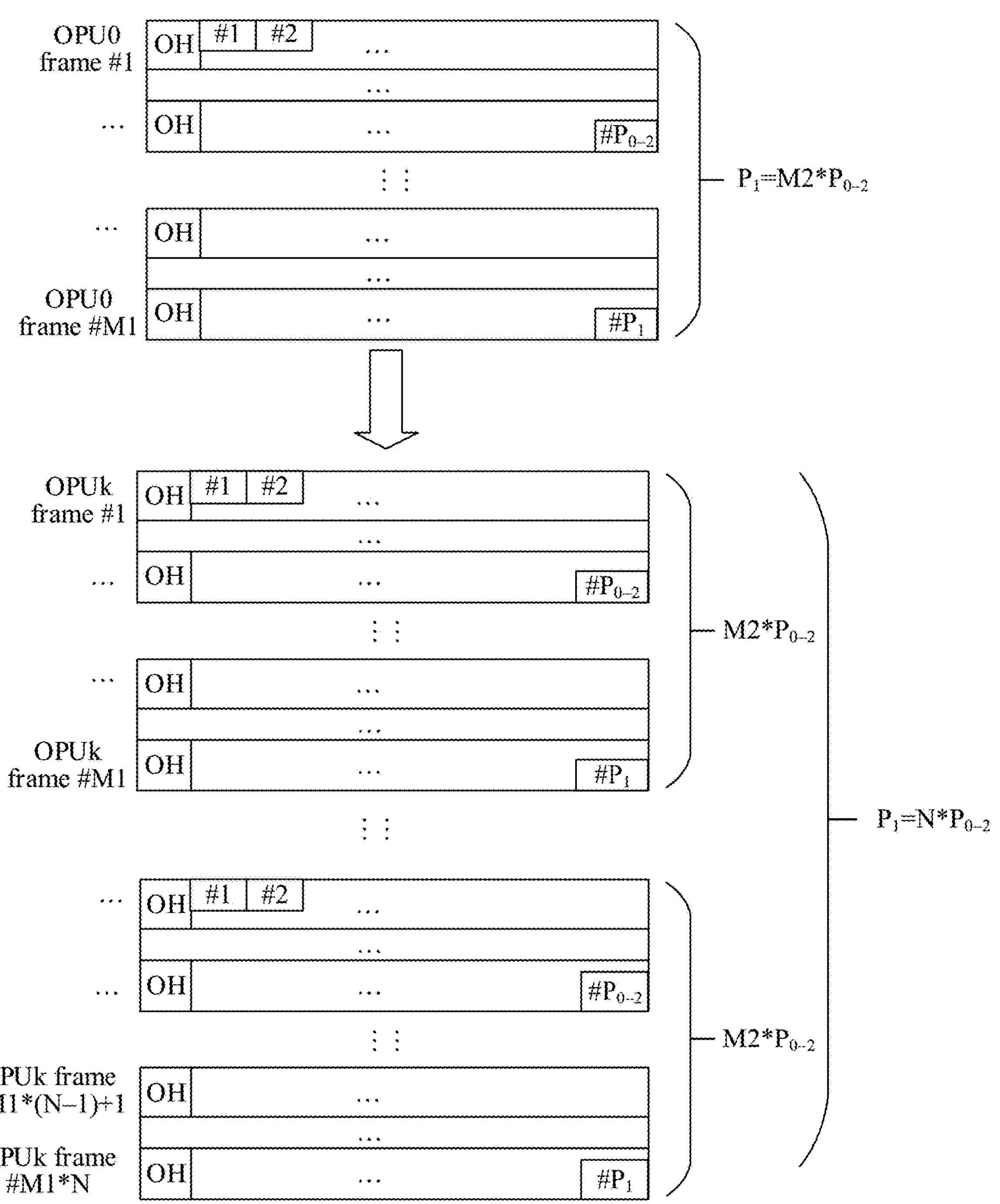
FIG. 8 is a diagram of a structure of another OPUk multiplexing frame according to an embodiment of this application.

FIG. 8 is a diagram of a structure of another OPUk multiplexing frame according to an embodiment of this application. As shown in FIG. 8, the OPU0 multiplexing frame consists of M1*M2 OPU0 frames, which are OPU0 frames #1 to #M1*M2. 1/M2 of the quantity of payload blocks included in the OPU0 multiplexing frame is represented by $P_{0-2}$. The quantity of payload blocks included in the OPU0 multiplexing frame may be M2*$P_{0-2}$. The OPUk multiplexing frame consists of M1*N OPUk frames, which are OPUk frames #1 to #M1*N. If the payload area of the OPUk multiplexing frame includes $P_1$ payload blocks, $P_1$=N*$P_{0-2}$.

In some embodiments, the quantity of payload blocks included in the OPUk multiplexing frame may be determined in any one of the following manners.

In a first manner, the quantity of payload blocks included in the OPUk multiplexing frame satisfies the following formula (6):

$$P_1 = \text{floor}\left[\frac{R_{OPU\_PLD} * (1 - xppm)}{(1/M2) * R_{OPUo\_PLD}}\right] * P_{0-2} \quad \text{Formula (6)}$$

$P_{0-2}$ represents 1/M2 of the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x represents a frequency offset. For example, a value of x may be 0, 20, or 100.

For example, $$N = \text{floor}\left[\frac{R_{OPU\_PLD} * (1 - xppm)}{R_{OPUo\_PLD}}\right]$$

is determined based on the first manner.

In a second manner, the quantity of payload blocks included in the OPUk multiplexing frame satisfies the following formula (7):

$$P_1 = \text{floor}\left[\frac{R_{OPU\_PLD} * (1 - xppm)}{(1/M2) * R_{OPUo\_PLD} * (1 + yppm)}\right] * P_{0-2} \quad \text{Formula (7)}$$

$P_{0-2}$ represents 1/M2 of the quantity of payload blocks included in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x and y each represent a frequency offset. For example, a value of x may be 0, 20, or 100. In some embodiments, y is a specified value, and may represent a frequency offset of a baseline rate.

In some embodiments, $R_{OPU\_PLD}$ in the formula (2) to the formula (7) may be replaced with $R_{ODU\_PLD}$, and $R_{OPU0\_PLD}$ is replaced with $R_{ODU0\_PLD}$, to obtain a $P_1$ value by transforming the formula (2) to the formula (7). $R_{ODU\_PLD}$ represents an ODUk payload bit rate, and $R_{ODU0\_PLD}$ represents an ODU0 payload bit rate. In some other embodiments, the foregoing formula (2) to formula (7) may alternatively be transformed based on the foregoing described relationship between the ODU payload bit rate and the OPU payload bit rate. Details are not described in this application.

In the second possible manner, a configuration manner of the multiframe indication overhead is similar to that in the first possible manner. Details are not described herein again.

For example, a size of the payload block is 192 bytes. The OPU0 multiplexing frame includes six OPU0 frames. The quantity of payload blocks included in the OPU0 multiplexing frame is 476. As shown in FIG. 6, every three frames of the six OPU0 frames included in the OPU0 multiplexing frame include 238 payload blocks. The OPUk multiplexing frame may be constructed based on the 238 payload blocks included in the OPU0 multiplexing frame. In this example, $P_{0-2}$=238, M2=2, and M1=3.

Figure 9:
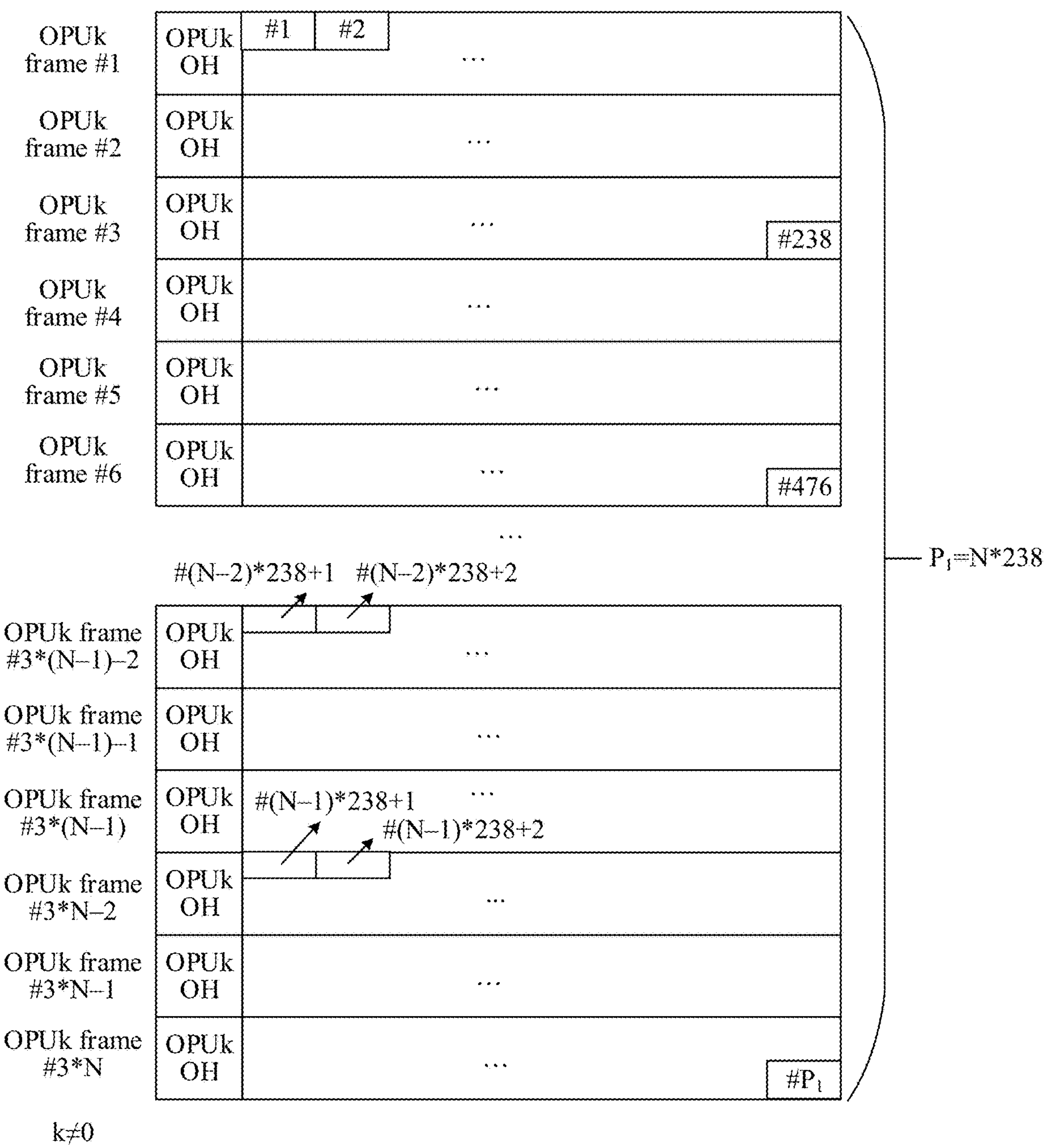
FIG. 9 is a diagram of a structure of still another OPUk multiplexing frame according to an embodiment of this application.

FIG. 9 is a diagram of a structure of still another OPUk multiplexing frame according to an embodiment of this application. The OPUk multiplexing frame includes 3N OPUk frames. For example, every three consecutive OPUk frames may be understood as an OPUk group, and the OPUk multiplexing frame includes N OPUk groups. The OPUk group may also be understood as a multiframe including three OPUk frames, and may also be referred to as an OPUk multiframe or a three-frame OPUk multiframe. A payload area of each OPUk multiframe is divided into 238*192-byte payload blocks. Therefore, the OPUk multiplexing frame includes N*238 payload blocks in total. Refer to FIG. 9. The payload blocks are sequentially marked as a payload block #1, a payload block #2, . . . , and a payload block #$P_1$ starting from the first payload block in the first OPUk frame, where a size of each payload block is 192 bytes.

When k in the OPUk multiplexing frame determined in the second possible manner is set to different values, the value of $P_1$ is the same as the value of $P_1$ determined in the first possible manner. For example, the size of the payload block is 192 bytes. When k in the OPUk multiplexing frame is set to different values, the value of $P_1$ may be shown in Table 3.

Based on this, embodiments of this application provide an optical signal transmission method and an apparatus. An OPUk multiplexing frame with a bit rate greater than 1.25 Gbps is constructed by using a structure of an OPU0 multiplexing frame, so that the structure of the OPU0 multiplexing frame is reused by the structure of the OPUk multiplexing frame, and the structure of the OPUk multiplexing frame can be aligned with the structure of the OPU0 multiplexing frame. In addition, the OPUk multiplexing frame includes an integer multiple of OPUk frames, thereby reducing processing complexity. The method and the apparatus are based on a same inventive concept. Because the method and the apparatus have similar principles for resolving a problem, mutual reference may be made to implementations of the apparatus and the method. Descriptions of repeated parts are not described.

Figure 10:
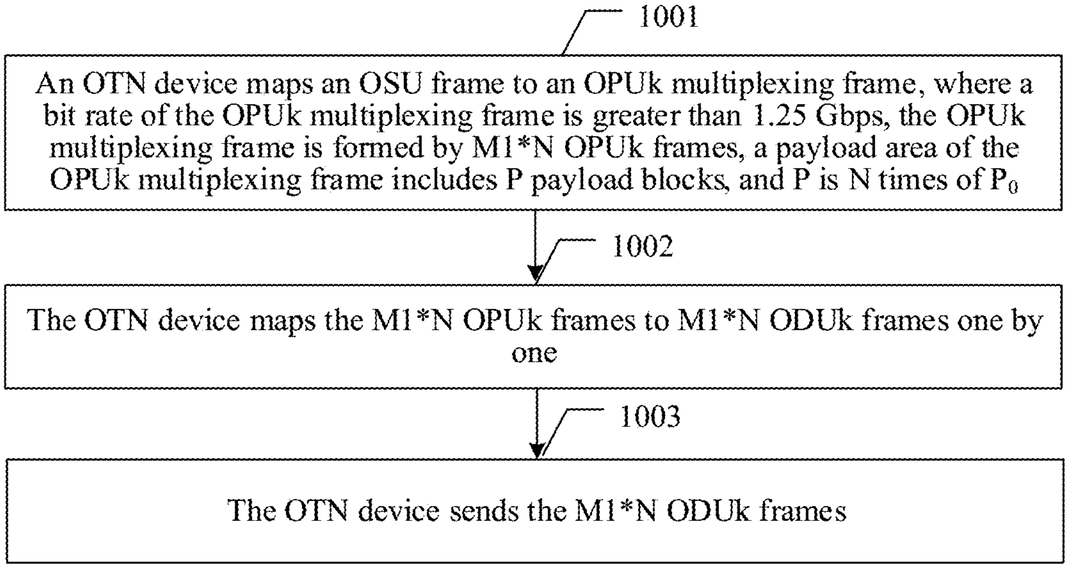
FIG. 10 is a schematic flowchart of an optical signal transmission method according to an embodiment of this application.

FIG. 10 is a schematic flowchart of an optical signal transmission method according to an embodiment of this application. The optical signal transmission method may be executed by an OTN device, for example, may be implemented by the tributary board and/or the line board in the OTN device shown in FIG. 2. Alternatively, the method may be executed by a processing module disposed in the OTN device, or may be executed by a processing chip.

1001: The OTN device maps an OSU frame to an OPUk multiplexing frame, where a bit rate of the OPUk multiplexing frame is greater than 1.25 Gbps. The OPUk multiplexing frame consists of M1*N OPUk frames, a payload area of the OPUk multiplexing frame includes P payload blocks, and P is N times of $P_0$. A value of $P_0$ is the same as that described above. Details are not described herein again.

1002: The OTN device maps the M1*N OPUk frames to M1*N ODUk frames one by one.

1003: The OTN device sends the M1*N ODUk frames.

In this embodiment of this application, the OPUk multiplexing frame with the bit rate greater than 1.25 Gbps is constructed by using a structure of an OPU0 multiplexing frame, so that the structure of the OPU0 multiplexing frame is reused by a structure of the OPUk multiplexing frame, and the structure of the OPUk multiplexing frame is aligned with the structure of the OPU0 multiplexing frame. The OPUk multiplexing frame includes an integer multiple of OPUk frames. A boundary of the OPUk multiplexing frame is aligned with a boundary of the OPUk frame. Further, the OTN device may map the OSU frame to the OPUk multiplexing frame based on the reused structure of the OPU0 multiplexing frame. A position of the payload block may be obtained more quickly in each transport period, thereby reducing processing complexity.

Figure 11:
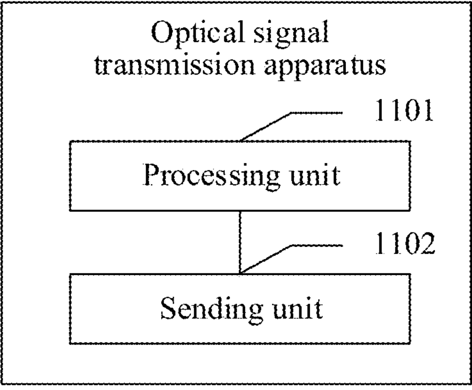
FIG. 11 is a diagram of a structure of an optical signal transmission apparatus according to an embodiment of this application.

An embodiment of this application further provides an optical signal transmission apparatus. The method, the apparatus, and the system are based on a same inventive concept. Because the method, the apparatus and the system have similar principles for resolving problems, mutual reference may be made to embodiments of the apparatus and the method. Details of repeated parts are not described. The apparatus may be used in an OTN device. The apparatus may be specifically a processor, a chip, a chip system, or a module in the processor in the OTN device. The apparatus may be implemented by the tributary board and/or the line board in FIG. 2. FIG. 11 is a diagram of a structure of a possible optical signal transmission apparatus according to an embodiment of this application. As shown in FIG. 11, the apparatus includes a processing unit 1101 and a sending unit 1102. The processing unit 1101 is configured to perform step 1001 and step 1002. The sending unit 1102 is configured to perform step 1003.

Optionally, the foregoing two units may further execute another related optional step executed by the OTN device mentioned in any one of the foregoing embodiments. Details are not described herein again.

In embodiments of this application, division into units is an example, and is merely a logical function division. During actual implementation, another division manner may be used. In addition, functional units in embodiments of this application may be integrated into one processor, or each of the units may exist alone physically, or two or more units are integrated into one unit. The integrated unit may be implemented in a form of hardware, or may be implemented in a form of a software functional unit.

Figure 12:
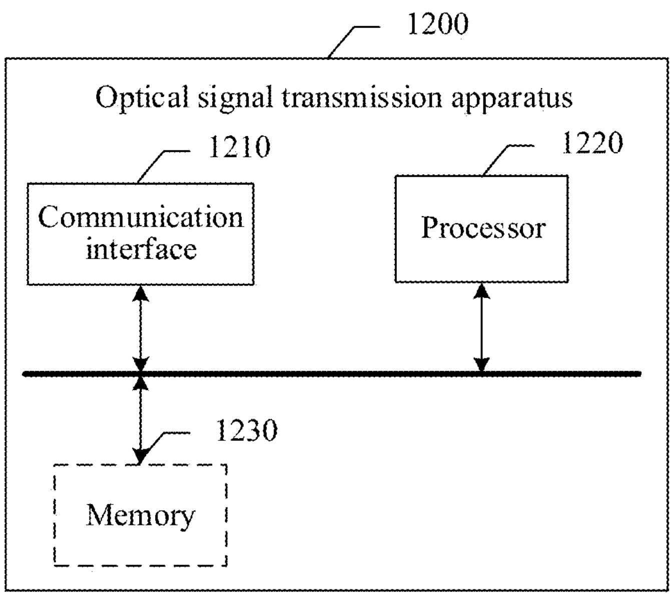
FIG. 12 is a diagram of a structure of another optical signal transmission apparatus according to an embodiment of this application.

FIG. 12 is a diagram of a structure of another possible optical signal transmission apparatus according to an embodiment of this application. As shown in FIG. 12, the apparatus 1200 includes a communication interface 1210 and a processor 1220. The apparatus 1200 may be used in an OTN device. The apparatus 1200 may further include a memory 1230.

Both a processing unit 1201 and a sending unit 1202 shown in FIG. 12 may be implemented by the processor 1220. For example, the processor 1220 may be a signal processor in the line board and/or a signal processor in the tributary board shown in FIG. 2. The processor 1220 sends an OTN frame (for example, the OTUk frame or the ODUk frame mentioned in the foregoing embodiments) through the communication interface 1210, to implement the method performed by the OTN device in FIG. 10. In an implementation process, the steps of the processing procedure may complete, by using an integrated logic circuit of hardware in the processor 1220 or instructions in a form of software, the method performed by the OTN device in FIG. 10.

The communication interface 1210 may be a circuit, a bus, a transceiver, or any other apparatus for exchanging information. For example, the another apparatus may be a device connected to the apparatus 1200. For example, the another apparatus may be a client device or another OTN device.

The processor 1220 may be a general-purpose processor, a digital signal processor, an application-specific integrated circuit, a field programmable gate array or another programmable logic device, a discrete gate or a transistor logic device, or a discrete hardware component. The general-purpose processor may be a microprocessor, any conventional processor, or the like. The steps of the method disclosed with reference to embodiments of this application may be directly executed by a hardware processor, or may be performed by using a combination of hardware and software units in the processor. Program code executed by the processor 1220 to implement the foregoing method may be stored in the memory 1230. The memory 1230 is coupled to the processor 1220. The coupling in embodiments of this application may be an indirect coupling or a communication connection between apparatuses, units, or modules. The coupling may be implemented in electronic, mechanical, and other forms, and is used for information exchange between the apparatuses, the units, or the modules. The processor 1220 may operate in collaboration with the memory 1230. The memory 1230 may be a nonvolatile memory such as a hard disk drive (HDD) or a solid-state drive (SSD); or may be a volatile memory such as a random-access memory (RAM). The memory 1230 is any other medium that can be used to carry or store program code in a form of an instruction or a data structure and that can be accessed by a computer, but is not limited thereto.

A specific connection medium among the communication interface 1210, the processor 1220, and the memory 1230 is not limited in embodiments of this application. In embodiments of this application, in FIG. 12, the memory 1230, the processor 1220, and the communication interface 1210 are connected through a bus. The bus is represented by using a bold line in FIG. 12. A connection manner between other components is merely an example for description, and is not limited thereto. The bus may be classified as an address bus, a data bus, a control bus, and the like. For ease of representation, only one bold line is used to represent the bus in FIG. 12, but this does not mean that there is only one bus or only one type of bus.

Based on the foregoing embodiments, an embodiment of this application further provides a computer storage medium. The storage medium stores a software program. When the software program is read and executed by one or more processors, the method provided in any one or more of the foregoing embodiments may be implemented. The computer storage medium may include any medium that can store program code, such as a USB flash drive, a removable hard disk, a read-only memory, or a random-access memory.

Based on the foregoing embodiments, an embodiment of this application further provides a chip. The chip includes a processor, configured to implement functions involved in any one or more of the foregoing embodiments, for example, obtaining or processing the OPUk frame or the ODUk frame involved in the foregoing method. Optionally, the chip further includes a memory. The memory is configured to store necessary program instructions and data to be executed by the processor. The chip may include a chip, or include a chip and another discrete device.

A person skilled in the art should understand that embodiments of this application may be provided as a method, a system, or a computer program product. Therefore, this application may use a form of an entire hardware embodiment, an entire software embodiment, or an embodiment with a combination of software and hardware aspects. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may also be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art may make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. An optical signal transmission method comprising:

mapping an optical service unit frame to an optical payload unit (OPUk) multiplexing frame, wherein a bit rate of the OPUk multiplexing frame is greater than 1.25 Gbps, wherein the OPUk multiplexing frame consists of M1*N OPUk frames, wherein a payload area of the OPUk multiplexing frame comprises P payload blocks, and P is N times of $P_0$, and wherein $P_0$ is a quantity of payload blocks comprised in an OPU0 multiplexing frame, and the OPU0 multiplexing frame comprises M1 OPU0 frames; or $P_0$ is 1/M2 of a quantity of payload blocks comprised in an OPU0 multiplexing frame, and the OPU0 multiplexing frame comprises M1*M2 OPU0 frames, wherein N is an integer greater than 1, M1 is an integer greater than or equal to 1, and M2 is an integer greater than 1;

mapping the M1*N OPUk frames to M1*N optical data unit ODUk frames one by one; and sending the M1*N ODUk frames.

2. The method according to claim 1, wherein the quantity P of payload blocks comprised in the OPUk multiplexing frame satisfies the following:

$$P = \text{floor}\left[\frac{R_{OPU\_PLD} * (1 - xppm)}{R_{ref} * P_0}\right] * P_0; \text{ or}$$

$$P = \text{floor}\left[\frac{R_{OPU\_PLD} * (1 - xppm)}{R_{ref} * P_0 * (1 + yppm)}\right] * P_0;$$

wherein $P_0$ represents the quantity of payload blocks comprised in the OPU0 multiplexing frame, floor represents rounding down, $R_{OPU\_PLD}$ represents a bit rate of an OPUk payload area, x and y each represent a frequency offset, ppm represents parts per million, and $R_{ref}$ represents a baseline rate of a payload block.

3. The method according to claim 2, wherein $R_{ref}$ is 2.6 Mbit/s.

4. The method according to claim 1, wherein the quantity of payload blocks comprised in the OPUk multiplexing frame satisfies the following:

$$P = \text{floor}\left[\frac{R_{OPU\_PLD} * (1 - xppm)}{R_{OPUo\_PLD}}\right] * P_0; \text{ or}$$

$$P = \text{floor}\left[\frac{R_{OPU\_PLD} * (1 - xppm)}{R_{OPUo\_PLD} * (1 + yppm)}\right] * P_0;$$

wherein $P_0$ represents the quantity of payload blocks comprised in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x and y each represent a frequency offset.

5. The method according to claim 1, wherein an overhead area of each of the M1*N ODUk frames comprises a multiframe indication, and M1*N multiframe indications each indirectly indicate a bit position of a payload block comprised in a payload area of each OPUk frame in the M1*N OPUk frames; or an overhead area of each of the M1*N OPUk frames comprises a multiframe indication.

6. The method according to claim 1, wherein an overhead area of each of the M1*N OPUk frames comprises:

a first multiframe indication and a second multiframe indication, the M1*N OPUk frames comprise N OPUk groups, each OPUk group comprises M1 consecutive OPUk frames, each of M1 first multiframe indications comprised in the OPUk group indirectly indicates a bit position of a payload block comprised in each OPUk frame in the OPUk group, and a second multiframe indication comprised in each OPUk frame in the OPUk group indicates a position of the OPUk group in the N OPUk groups; or a first multiframe indication and a second multiframe indication.

7. The method according to claim 1, wherein the OPUk is an OPU1, an OPU2, an OPU2*e*, an OPU3, an OPU4, an OPU25, an OPU25*u*, an OPU50, an OPU50*u*, an OPUCn, or an OPUflex.

8. The method according to claim 1, wherein $P_0$ is the quantity of payload blocks comprised in the OPU0 multiplexing frame, and a value of $P_0$ is a multiple of 238.

9. The method according to claim 1, wherein a size of the payload block is an integer multiple of 8 bytes.

10. The method according to claim 9, wherein a size of the payload block is 16 bytes.

11. The method according to claim 1, wherein the k is not 0.

12. A chip configured to:

map an optical service unit frame to an optical payload unit (OPUk) multiplexing frame;

wherein a bit rate of the OPUk multiplexing frame is greater than 1.25 Gbps, wherein the OPUk multiplexing frame consists of M1*N OPUk frames, wherein a payload area of the OPUk multiplexing frame comprises P payload blocks, and P is N times of $P_0$, and wherein $P_0$ is a quantity of payload blocks comprised in an OPU0 multiplexing frame, and the OPU0 multiplexing frame comprises M1 OPU0 frames; or $P_0$ is 1/M2 of a quantity of payload blocks comprised in an OPU0 multiplexing frame, and the OPU0 multiplexing frame comprises M1*M2 OPU0 frames, wherein N is an integer greater than 1, M1 is an integer greater than or equal to 1, and M2 is an integer greater than 1;

map the M1*N OPUk frames to M1*N optical data unit ODUk frames one by one; and send the M1*N ODUk frames.

13. The chip according to claim 12, wherein the quantity P of payload blocks comprised in the OPUk multiplexing frame satisfies the following:

$$P = \text{floor}\left[\frac{R_{OPU\_PLD} * (1 - xppm)}{R_{ref} * P_0}\right] * P_0; \text{ or}$$

$$P = \text{floor}\left[\frac{R_{OPU\_PLD} * (1 - xppm)}{R_{ref} * P_0 * (1 + yppm)}\right] * P_0;$$

wherein $P_0$ represents the quantity of payload blocks comprised in the OPU0 multiplexing frame, floor represents rounding down, $R_{OPU\_PLD}$ represents a bit rate of an OPUk payload area, x and y each represent a frequency offset, ppm represents parts per million, and $R_{ref}$ represents a baseline rate of a payload block.

14. The chip according to claim 12, wherein the quantity of payload blocks comprised in the OPUk multiplexing frame satisfies the following:

$$P = \text{floor}\left[\frac{R_{OPU\_PLD} * (1 - xppm)}{R_{OPUo\_PLD}}\right] * P_0; \text{ or}$$

$$P = \text{floor}\left[\frac{R_{OPU\_PLD} * (1 - xppm)}{R_{OPUo\_PLD} * (1 + yppm)}\right] * P_0;$$

wherein $P_0$ represents the quantity of payload blocks comprised in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x and y each represent a frequency offset.

15. The chip according to claim 12, wherein an overhead area of each of the M1*N ODUk frames comprises:

a multiframe indication, and M1*N multiframe indications each indirectly indicate a bit position of a payload block comprised in a payload area of each OPUk frame in the M1*N OPUk frames; or a multiframe indication.

16. The chip according to claim 12, wherein the OPUk is an OPU1, an OPU2, an OPU2*e*, an OPU3, an OPU4, an OPU25, an OPU25*u*, an OPU50, an OPU50*u*, an OPUCn, or an OPUflex.

17. The chip according to claim 12, wherein $P_0$ is the quantity of payload blocks comprised in the OPU0 multiplexing frame, and a value of $P_0$ is a multiple of 238.

18. The chip according to claim 12, wherein a size of the payload block is an integer multiple of 8 bytes.

19. The chip according to claim 18, wherein a size of the payload block is 16 bytes.

20. The chip according to claim 12, wherein the k is not 0.

21. An optical signal transmission apparatus comprising a processor and an optical transceiver, wherein the processor is configured to:

send an optical transport network (OTN) frame by cooperating with the optical transceiver, map an optical service unit frame to an optical payload unit (OPUk) multiplexing frame;

wherein a bit rate of the OPUk multiplexing frame is greater than 1.25 Gbps, wherein the OPUk multiplexing frame consists of M1*N OPUk frames, wherein a payload area of the OPUk multiplexing frame comprises P payload blocks, and P is N times of $P_0$, and wherein $P_0$ is a quantity of payload blocks comprised in an OPU0 multiplexing frame, and the OPU0 multiplexing frame comprises M1 OPU0 frames; or $P_0$ is 1/M2 of a quantity of payload blocks comprised in an OPU0 multiplexing frame, and the OPU0 multiplexing frame comprises M1*M2 OPU0 frames, wherein N is an integer greater than 1, M1 is an integer greater than or equal to 1, and M2 is an integer greater than 1;

map the M1*N OPUk frames to M1*N optical data unit ODUk frames one by one; and send the M1*N ODUk frames.

22. The apparatus according to claim 21, wherein the quantity of payload blocks comprised in the OPUk multiplexing frame satisfies the following:

$$P = \text{floor}\left[\frac{R_{OPU\_PLD} * (1 - xppm)}{R_{OPUo\_PLD}}\right] * P_0; \text{ or}$$

$$P = \text{floor}\left[\frac{R_{OPU\_PLD} * (1 - xppm)}{R_{OPUo\_PLD} * (1 + yppm)}\right] * P_0;$$

wherein $P_0$ represents the quantity of payload blocks comprised in the OPU0 multiplexing frame, floor represents rounding down, $R_{OPU\_PLD}$ represents a bit rate of an OPUk payload area, $R_{OPU0\_PLD}$ represents a bit rate of an OPU0 payload area, and x and y each represent a frequency offset.

23. The apparatus according to claim 21, wherein an overhead area of each of the M1*N ODUk frames comprises:

a multiframe indication, and M1*N multiframe indications each indirectly indicate a bit position of a payload block comprised in a payload area of each OPUk frame in the M1*N OPUk frames; or a multiframe indication.

24. The apparatus according to claim 21, wherein the OPUk is an OPU1, an OPU2, an OPU2*e*, an OPU3, an OPU4, an OPU25, an OPU25*u*, an OPU50, an OPU50*u*, an OPUCn, or an OPUflex.

25. The apparatus according to claim 21, wherein $P_0$ is the quantity of payload blocks comprised in the OPU0 multiplexing frame, and a value of $P_0$ is a multiple of 238.

26. The apparatus according to claim 21, wherein a size of the payload block is an integer multiple of 8 bytes.

27. The apparatus according to claim 26, wherein a size of the payload block is 16 bytes.

28. The apparatus according to claim 21, wherein the k is not 0.

* * * * *